US012760588B2

(12) United States Patent
Ledesma

(10) Patent No.: US 12,760,588 B2
(45) Date of Patent: Oct. 13, 2026

(54) FLOOD BARRIER AND METHOD OF USE

(71) Applicant: Crawford Tracey Corporation, Deerfield, FL (US)

(72) Inventor: Edward Ledesma, Miami, FL (US)

( * ) Notice: Subject to any disclaimer, the term of this patent is extended or adjusted under 35 U.S.C. 154(b) by 294 days.

(21) Appl. No.: 18/352,310

(22) Filed: Jul. 14, 2023

(65) Prior Publication Data

US 2025/0020017 A1 Jan. 16, 2025

(51) Int. Cl.
*E06B 3/663* (2006.01)
*E06B 9/00* (2006.01)

(52) U.S. Cl.
CPC .... *E06B 3/66342* (2013.01); *E06B 2009/007* (2013.01)

(58) Field of Classification Search
CPC .. E06B 1/62; E06B 2001/626; E06B 3/66342; E06B 3/5814; E06B 2009/007
See application file for complete search history.

(56) References Cited

U.S. PATENT DOCUMENTS 9,453,362 B2 * 9/2016 Condon .................... E04B 2/90
11,391,083 B1 7/2022 Shattuck
2002/0148178 A1 * 10/2002 Farag ...................... E06B 5/165 52/235
2012/0137603 A1 * 6/2012 Dudash ..................... E06B 1/34 52/202
2021/0238911 A1 * 8/2021 Theriault ............. E06B 3/2605

FOREIGN PATENT DOCUMENTS

DE 29919523 U1 * 4/2000 ............... E06B 9/00
DE 10334713 A1 * 2/2004 ............... E06B 1/62
DE 10317291 A1 * 10/2004 ............... E06B 9/02

* cited by examiner

*Primary Examiner* — Christine T Cajilig

(57) ABSTRACT

A flood barrier system for inhibiting the ingress of water through a window opening includes a frame configured to be received in the window opening. A first insulated glass unit comprising a plurality of glass panels is fixed to the exterior surface of the frame by a continuous structural glaze that extends the perimeter of the frame on the exterior surface. The flood barrier is positioned in the window opening and fixed relative thereto so that the interior surface of the first insulated glass unit is adjacent to an area inside the window opening and the exterior surface of the first insulated glass unit is adjacent to an area outside the window opening. In some embodiments, flood barrier is configured to have no material leakage through the window opening.

18 Claims, 7 Drawing Sheets

FLOOD BARRIER AND METHOD OF USE

TECHNICAL FIELD

The present disclosure generally relates to an enclosure for an opening in a building. More specifically, the present invention relates to a flood barrier for use in a curtain wall or window wall system for inhibiting the ingress of water through a window opening in a structure.

BACKGROUND

Flooding is one of the most complex property risks facing property owners and insurers alike. Ongoing analysis by the FM Approvals parent company, FM Global, shows that a property located within a published flood zone is five to seven times more likely to suffer property loss due to flood damage than to suffer an equivalent loss due to fire or explosion. In addition, the average flood related property loss is about 1.5 times greater than the average fire loss.

Approximately one in ten industrial buildings are located within a flood zone. Buildings at risk for flooding must prepare well in advance in order to keep water out of critical interior areas of the building and limit resulting property damages.

Curtain wall and window wall systems form a barrier between a building's exterior and interior on the façade of a building structure. In curtain wall and window wall systems, individual rigid panels, also referred to as flood barriers herein, of a manageable size and weight are fabricated to be installed as a stand-alone individual panel or have multiple panels fit together as an assembly to cover the opening area on the building' façade intended to be enclosed. These rigid panels are inserted into window openings and are sealed at all joints between individual panels and joints between the panels and the building structure. These rigid panels can take on a variety of exterior appearances but in general they consist largely of clear glass panels.

It should be understood that the present invention is directed to flood barriers for buildings. The flood barriers are positioned between an outside of the building and an inside of the building and thus form a barrier between the outside of the building and the inside of the building. This disclosure may refer to the space where the barrier is positioned between the outside of the building and the inside of the building as a window opening. The use of this term is not intended to and does not limit the present disclosure. For example, use of the barriers are not limited to a specific geometry or opening size. As discussed through out, this disclosure applies to barriers used to form curtain walls and barriers use to form window walls. The term window systems, as used in the present disclosure, is intended to include both curtain wall systems and window wall systems. Furthermore, the term flood barrier, as used in the present disclosure, is intended to cover both curtain wall systems and window wall systems.

Given the projected sea level rise and the increase in flooding events throughout major cities of the US and worldwide, and as FEMA expands their flood zoning maps, authorities having jurisdiction such as cities, counties and states, as well as property insurers have established restrictions on the use of such curtain wall and window wall systems as they relate to flooding and the prevention of flood water ingress through a building's facade.

A disadvantage of known flood barrier systems is that they do not inhibit the ingress of flood water through window opening and therefore cannot be used within jurisdictions imposing such restrictions.

Thus, there exists a need in the art for an improved flood barrier that not only resists wind, impacts, and rain, like other typical known systems in the market, but also is capable of withstanding flood water and the ingress of flood water into the building's interior.

SUMMARY OF THE INVENTION

The needs set forth herein as well as further and other needs and advantages are addressed by the present teachings, which illustrate solutions and advantages described below.

The present invention resides in one aspect in a flood barrier curtain wall or window wall system for inhibiting the ingress of water through a window opening in a structure has a width, a height, and a depth. The system includes a flood barrier. (I'm not clear on the intention of the previous sentences) The flood barrier curtain or window wall includes a first frame configured to be received in the window opening. The first frame comprises a top member, a bottom member opposite the top member, a first side member perpendicular to the top member, and a second side member parallel to the first side member. The members are arranged to form a rectangle that has a through opening. The first frame has an exterior surface that is parallel to the window opening when the flood barrier is received in the window opening. The first frame has an outside surface that is perpendicular to the window opening when the flood barrier is received in the window opening. The outside surface extends along a perimeter of the first frame. The first frame has an inside surface defining the through opening. The inside surface is perpendicular to the window opening when the flood barrier is received in the window opening. The first frame further includes a first insulated glass unit that comprises a first panel of glass defining an interior surface of the first insulated glass unit. The first insulated glass unit further comprises a second panel of glass. The first insulated glass panel comprises a third panel of glass defining an exterior surface of the first insulated glass unit. The second panel of glass is disposed between the first panel of glass and the third panel of glass. The third panel of glass is spaced apart from the second panel of glass so as to define a cavity between the second panel of glass and the third panel of glass. A spacer is between the second panel of glass and the third panel of glass. The spacer extends along at least a portion of a periphery of the second panel of glass and the third panel of glass. The exterior surface of the first frame is fixed to the interior surface of the first insulated glass unit by a structural sealant between the exterior surface of the first frame and the interior surface of the first insulated glass unit. The flood barrier is positioned in the window opening and fixed relative thereto so that the interior surface of the first insulated glass unit is adjacent to an area inside the window opening and the exterior surface of the first insulated glass unit is adjacent to an area outside the window opening. The flood barrier inhibits the ingress of water through the window opening from the area outside the window opening to the area inside the window opening.

In yet a further embodiment of the flood barrier system for inhibiting the ingress of water through a window opening, the structural sealant comprises a glazing ribbon of silicone between the exterior surface of the first frame and the interior surface of the first insulated glass unit.

In yet a further embodiment of the flood barrier system for inhibiting the ingress of water through a window opening, the glazing ribbon contacts an exterior surface of the top member, an exterior surface of the bottom member, an exterior surface of the first side member, and an exterior surface of the second side member.

In yet a further embodiment of the flood barrier system for inhibiting the ingress of water through a window opening, the glazing ribbon extends continuously around the rectangle formed by the top member, the bottom member, the first side member, and the second side member.

In yet a further embodiment of the flood barrier system for inhibiting the ingress of water through a window opening, the glazing ribbon extends continuously around the rectangle formed by the top member, the bottom member, the first side member, and the second side member.

In yet a further embodiment of the flood barrier system for inhibiting the ingress of water through a window opening, the system includes a seal between the flood barrier system and the window opening.

In yet a further embodiment of the flood barrier system for inhibiting the ingress of water through a window opening, the system is configured to have no material leakage through the window opening from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit.

In yet a further embodiment of the flood barrier system for inhibiting the ingress of water through a window opening, wherein the system is configured to have no material leakage through the window opening from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit; wherein said leakage is determined after the exterior surface of the flood barrier is subject to at least two impacts of 600 Joules or greater in an area remote from a perimeter of the flood barrier.

In yet a further embodiment of the flood barrier system for inhibiting the ingress of water through a window opening, wherein the flood barrier system is certified under ANSI/FM 2150.

In yet a further embodiment of the flood barrier system for inhibiting the ingress of water through a window opening, the system further comprises a seat element fixed relative to the bottom member and extending distally from the exterior surface of the frame in a direction perpendicular to the window opening. A bottom surface of the first insulated glass unit is in contact with the seat element such that the seat element inhibits translational movement of the first insulated glass unit relative to the first frame unit along a plane parallel to the window opening.

In yet a further embodiment of the flood barrier system for inhibiting the ingress of water through a window opening, the system excludes a structure external to the first insulated glass unit, the structure are configured to retain the first insulated glass unit in position relative to the first frame.

In yet a further embodiment of the flood barrier system for inhibiting the ingress of water through a window opening, the flood barrier further comprises a second frame configured to be received in the window opening. The second frame comprises a top member, a bottom member opposite the top member, a first side member perpendicular to the top member, and a second side member parallel to the first side member. The members are arranged to form a rectangle that has a through opening. The second frame has an exterior surface that is parallel to the window opening when the flood barrier is received in the window opening. The second frame has an outside surface that is perpendicular to the window opening when the flood barrier is received in the window opening. The outside surface extends along a perimeter of the second frame. The second frame has an inside surface defining the through opening. The inside surface are perpendicular to the window opening when the flood barrier is received in the window opening. The system includes a second insulated glass unit that includes a first panel of glass defining an interior surface of the second insulated glass unit. The second insulated glass unit further comprises a second panel of glass. The second insulated glass panel comprises a third panel of glass defining an exterior surface of the second insulated glass unit. The second panel of glass is disposed between the first panel of glass and the third panel of glass. The third panel of glass is spaced apart from the second panel of glass so as to define a cavity between the second panel of glass and the third panel of glass. A spacer is between the second panel of glass and the third panel of glass. The spacer extends along at least a portion of a periphery of the second panel of glass and the third panel of glass. The exterior surface of the second frame is fixed to the interior surface of the second insulated glass unit by a structural sealant between the exterior surface of the second frame and the interior surface of the second insulated glass unit. The first frame is adjacent to the second frame when the flood barrier is received in the window opening so that the exterior surface of the first insulated glass unit is coplanar with the exterior surface of the second insulated glass unit. The second side member of the first frame is adjacent to the first side member of the second frame.

In yet a further embodiment of the flood barrier system for inhibiting the ingress of water through a window opening, the second side member of the first frame and the first side member of the second frame are configured to snap together after the first insulated glass unit is fixed to the first frame and after the second insulated glass unit is fixed to the second frame, thereby fixing the first frame relative to the second frame.

In yet a further embodiment of the flood barrier system for inhibiting the ingress of water through a window opening, the members of the first frame and the members of the second frame comprise mullions.

In yet a further embodiment of the flood barrier system for inhibiting the ingress of water through a window opening, the system includes a steel support extending through a vertical channel defined by one of the mullions.

In yet a further embodiment of the flood barrier system for inhibiting the ingress of water through a window opening, the system includes a seal between the first insulated glass unit and the second insulated glass unit.

In yet a further embodiment of the flood barrier system for inhibiting the ingress of water through a window opening, the seal between the flood barrier system and the window opening and the seal between the first insulated glass unit and the second insulated glass unit comprises a first silicone seal and a first foam backer rod adjacent thereto and aligned in a direction perpendicular to the window opening.

In yet a further embodiment of the flood barrier system for inhibiting the ingress of water through a window opening, the seal between the flood barrier system and the window opening and the seal between the first insulated glass unit and the second insulated glass unit comprises a second silicone seal and a first foam backer rod adjacent thereto and aligned in a direction perpendicular to the window opening.

The present invention resides in another aspect in a method of inhibiting the ingress of water through a window opening in a structure has a width, a height, and a depth. The method comprises step of providing a flood barrier has a first window unit and a second window unit. The first window unit comprises a first frame configured to be received in the window opening. The first frame comprises a top member, a bottom member opposite the top member, a first side member perpendicular to the top member, and a second side member parallel to the first side member. The members are arranged to form a rectangle that has a through opening. The first frame has an exterior surface that is parallel to the window opening when the flood barrier is received in the window opening. The first frame has an outside surface that is perpendicular to the window opening when the flood barrier is received in the window opening. The outside surface extends along a perimeter of the first frame. The first frame has an inside surface defining the through opening. The inside surface is perpendicular to the window opening when the flood barrier is received in the window opening. The first window further includes a first insulated glass unit that comprises a first panel of glass defining an interior surface of the first insulated glass unit. The first insulated glass unit further comprises a second panel of glass. The first insulated glass panel comprises a third panel of glass defining an exterior surface of the first insulated glass unit. The second panel of glass is disposed between the first panel of glass and the third panel of glass. The third panel of glass are spaced apart from the second panel of glass so as to define a cavity between the second panel of glass and the third panel of glass, a spacer between the second panel of glass and the third panel of glass, the spacer extending along at least a portion of a periphery of the second panel of glass and the third panel of glass. The second window unit comprises a second frame configured to be received in the window opening. The second frame comprises a top member, a bottom member opposite the top member, a first side member perpendicular to the top member, and a second side member parallel to the first side member. The members are arranged to form a rectangle having a through opening. The second frame has an exterior surface that is parallel to the window opening when the flood barrier is received in the window opening. The second frame has an outside surface that is perpendicular to the window opening when the flood barrier is received in the window opening. The outside surface extends along a perimeter of the second frame. The second frame has an inside surface defining the through opening. The inside surface is perpendicular to the window opening when the flood barrier is received in the window opening. The second window unit includes a second insulated glass unit comprises a first panel of glass defining an interior surface of the second insulated glass unit. The second insulated glass unit further comprises a second panel of glass. The second insulated glass panel comprises a third panel of glass defining an exterior surface of the second insulated glass unit. The second panel of glass is disposed between the first panel of glass and the third panel of glass. The third panel of glass are spaced apart from the second panel of glass so as to define a cavity between the second panel of glass and the third panel of glass. A spacer between the second panel of glass and the third panel of glass. The spacer extends along at least a portion of a periphery of the second panel of glass and the third panel of glass.

The method further includes the step of fixing the first insulated glass unit to the frame by supporting the first frame on a horizontal surface so that the exterior surface of the first frame is facing upwards. The method further includes the step of applying a continuous ribbon of structural sealant along the exterior surface of the first frame so that the continuous ribbon of structural sealant contacts the each of the members of the first frame. The method further includes the step of compressing the first insulated glass unit on the frame so that the exterior surface of the first frame is fixed to the interior surface of the first insulated glass unit by the continuous ribbon of structural sealant between the exterior surface of the first frame and the interior surface of the first insulated glass unit. The method further includes the step of fixing the second insulated glass unit to the frame by. The method further includes the step of supporting the second frame on a horizontal surface so that the exterior surface of the second frame is facing upwards. The method further includes the step of applying a continuous ribbon of structural sealant along the exterior surface of the second frame so that the continuous ribbon of structural sealant contacts the each of the members of the second frame. The method further includes the step of compressing the second insulated glass unit on the second frame so that the exterior surface of the second frame is fixed to the interior surface of the second insulated glass unit by the continuous ribbon of structural sealant between the exterior surface of the first frame and the interior surface the second insulated glass unit. At or proximate to a site of installation in the window opening, the method includes the step of fixing the second side member of the first frame. The method further includes the step of positioning the flood barrier in the window opening and fixing it relative thereto so that the interior surface of the first insulated glass unit is adjacent to an area inside the window opening and the exterior surface of the first insulated glass unit is adjacent to an area outside the window opening. The flood barrier inhibits the ingress of water through the window opening from the area outside the window opening to the area inside the window opening.

In yet a further embodiment of the method of inhibiting the ingress of water through a window opening in a structure, the continuous ribbon of structural sealant extends continuously around the rectangle formed by the top member, the bottom member, the first side member, and the second side member.

In yet a further embodiment of the method of inhibiting the ingress of water through a window opening in a structure, the method includes the step of providing a seal between the flood barrier system and the window opening.

In yet a further embodiment of the method of inhibiting the ingress of water through a window opening in a structure, the flood barrier is configured to have no material leakage through the window opening from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit.

In yet a further embodiment of the method of inhibiting the ingress of water through a window opening in a structure, the flood barrier system is certified under ANSI/FM 2150.

These and other aspects of the present invention will become apparent in light of the drawings and detailed description provided below.

DETAILED DESCRIPTION

Figure 1B:
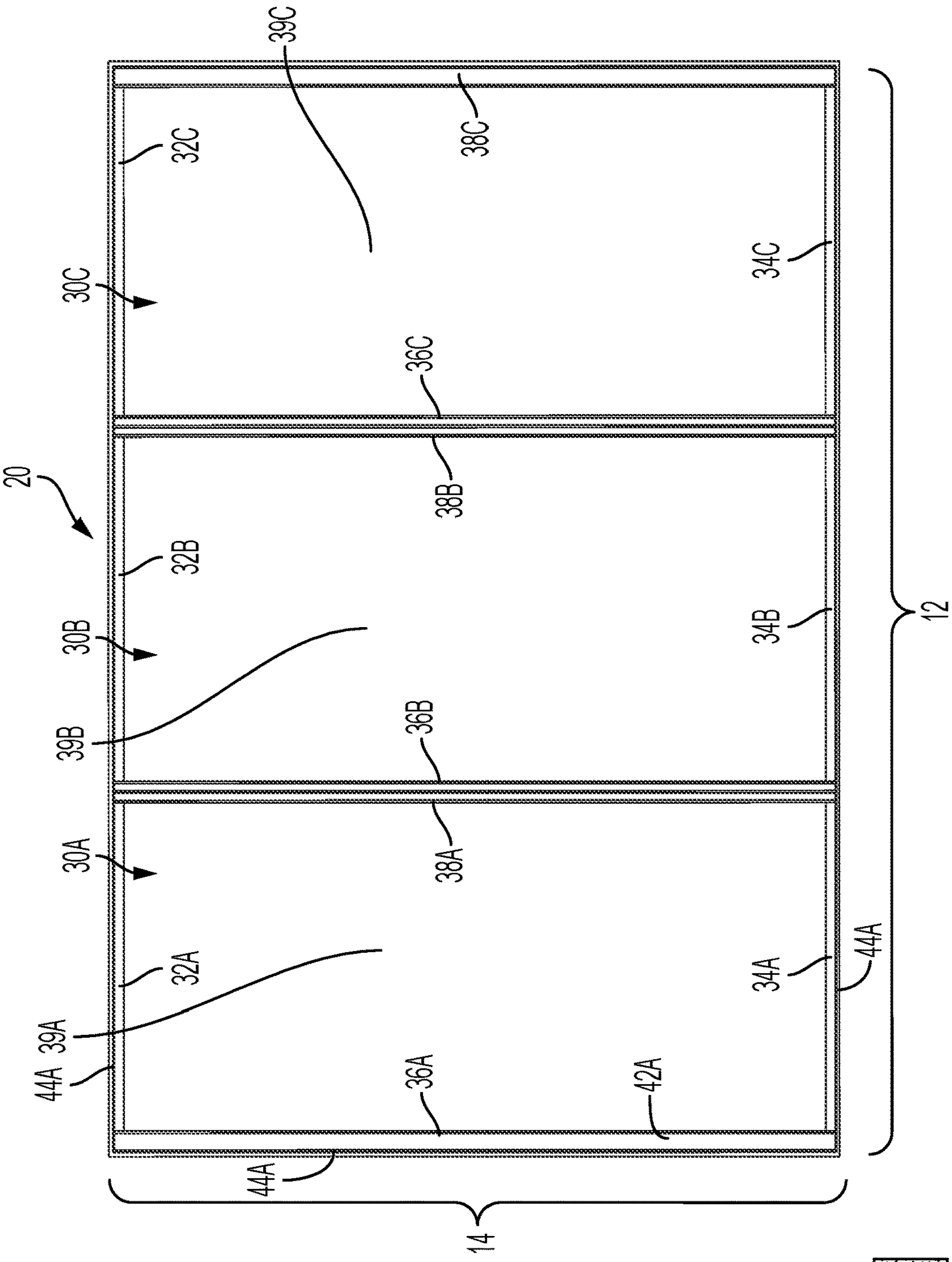
FIG. 1B is a cross sectional view of the flood barrier shown in FIG. 1 wherein the flood barrier is received in a window opening.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

FM Approvals was set up to test and approve products that are used in property that FM Global insures. FM approvals standards are widely used and recognized all over the world. FM Approvals is an accredited, third-party testing and certification organization. It has offices in Europe, Asia, and the Americas. FM Approvals, directly and in partnership with other testing agencies, evaluates many different types of loss prevention products, including flood protection products. It is the only organization that tests individual components and materials associated with flood mitigation products, as well as subjects products to fill scale simulated riverine flood tests.

Note that, throughout this description, reference to American National Standard FM 2510, also ANSI/FM 2510 or 2510, is made as per the capabilities of the disclosed system. It is well known that such codes are amended periodically and the intent of the present invention is to meet or exceed the codes currently defined by FM Approvals and/or the American National Standards Review.

FM 2510 evaluates not only the performance of the flood mitigation product in realistic flood conditions, but also the components and materials that comprise the product. For barriers, there are two types of requirements: general requirements and performance testing requirements. In the general requirements part of the standard, FM Approvals subject the barrier components and materials to several tests. For example, the flood barrier is subject to hydrostatic strength and leakage testing. After the hydrostatic test, the test tank is drained and the barrier is subjected to a 600 Joule force. This is then followed by a further hydrostatic test to confirm that flood barrier inhibits the flow of water through the opening. During the hydrostatic testing the leakage rate is measured. This is rate at which water moves past or through a floor barrier from the wet-side to the dry side of the barrier, expressed a gallons per hour per linear foot length of seal. Certification under FM2510 requires a leakage rate that shall not exceed 0.08 gallons per our per liner foot of seal over any 15 minute period, where the linear length of seal is the opening width plus two times the water height. For barriers with a maximum design water height greater than the barrier height, the linear length of the seal is considered to be the opening width plus two times the water height, or the barrier perimeter, whichever is less. If the leakage rate is less than or equal to 0.08 gallons per our per liner foot of seal over any 15 minute period, this is referred to as no material leakage for the purpose of this disclose.

The disclosed flood barrier system is a flood barrier that can meet the performance requirements of FM2510. Namely, a flood barrier configured to have no material leakage through the window opening from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit. For the purpose of this disclosure, material leakage shall mean an amount of water leakage that would cause failure of the barrier under FM2510. In the case of the presently disclosed barrier, they were tested at a height of four feet and a height equal to the height of the flood barrier. In both cases, there was no material leakage, both before and after the impact test.

The disclosed flood barrier window is further configured to have no material leakage through the window opening after a 600 Joule impact to an surface of the window. Namely, no material leakage from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit, wherein said leakage is determined after the exterior surface of the flood barrier is subject to an impact of 600 Joules or greater in an area remote from a perimeter of the flood barrier.

Figure 1A:
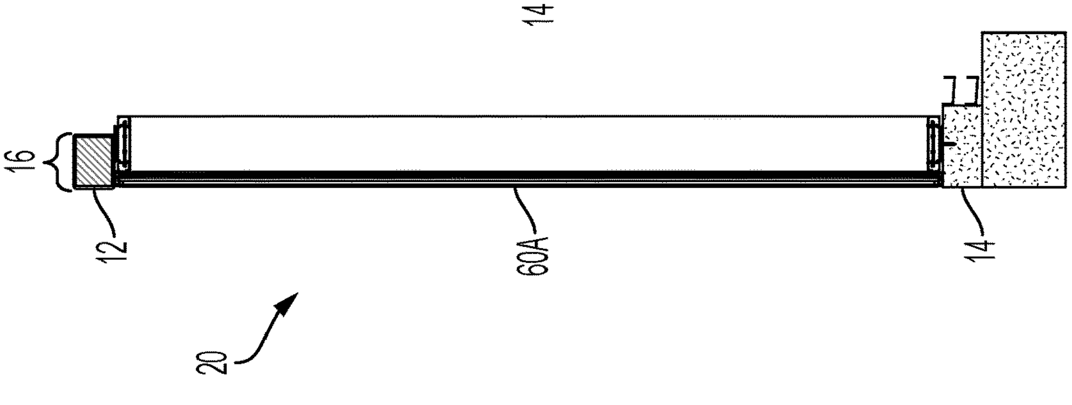
FIG. 1A illustrates a front view of a flood barrier in accordance with one embodiment of the present invention.

In reference to FIG. 1A, a portion of a flood barrier 20 in accordance with the present invention is shown. The flood barrier 20 is configured to inhibit the ingress of water through a window opening 10 in a structure having a width 12, a height 14, and a depth 16.

The flood barrier 20 includes a plurality of frames 30A, 30B, and 30C. Reference is specifically made to the individual components on the first frame 30A, however, the additional frames 30B, and 30C may be similarly constructed.

The first frame 30A is configured to be received in the window opening 10. The first frame 30A comprises a top member 32A, a bottom member 34A opposite the top member, a first side member 36A perpendicular to the top member, and a second side member 38A parallel to the first side member. The members 31A, 34A, 36A, 38A are arranged to form a rectangle having a through opening 39A. The first frame 30A has an exterior surface 42A that is parallel to the window opening 10 when the flood barrier 20 is received in the window opening. The first frame 30A has an outside surface 44A that is perpendicular to the window opening 10 when the flood barrier 20 is received in the window opening. The outside surface 44A extends along a perimeter of the first frame 30A. The first frame has an inside surface 46A that defines the through opening 39A. The inside surface 46A is perpendicular to the window opening 10 when the flood barrier 20 is received in the window opening 10.

In the embodiment disclosed in the FIGS, the members 32A, 34A, 36A, and 38A are formed as extruded aluminum mullions. A person of skill in the art and familiar with the disclosure will understand that the present invention is not limited in this regard and that other forms may be used for the frame members. The members are configured to fit together to form the rectangle. In the embodiment disclosed in the FIGS, the mullions define a cavity extending through the length of the mullion between a first opening and a second opening. In the disclosed embodiments, a stiffening element is provided in the tube of one or more mullions. For example, a steel reinforcing tube may be disposed in one or more of the mullions. It in some embodiments, the steel reinforcement maybe included in mullions remote from an edge of the floor barrier window wall. In this manner, the inventor has discovered that the resiliency of the system can be enhanced, thereby ensuring that the system complies with FM 2510 and more specifically, the impact test. This is particularly useful, for example, when a plurality of frames 30A, 30B, and 30C are combined together.

Figure 1C:
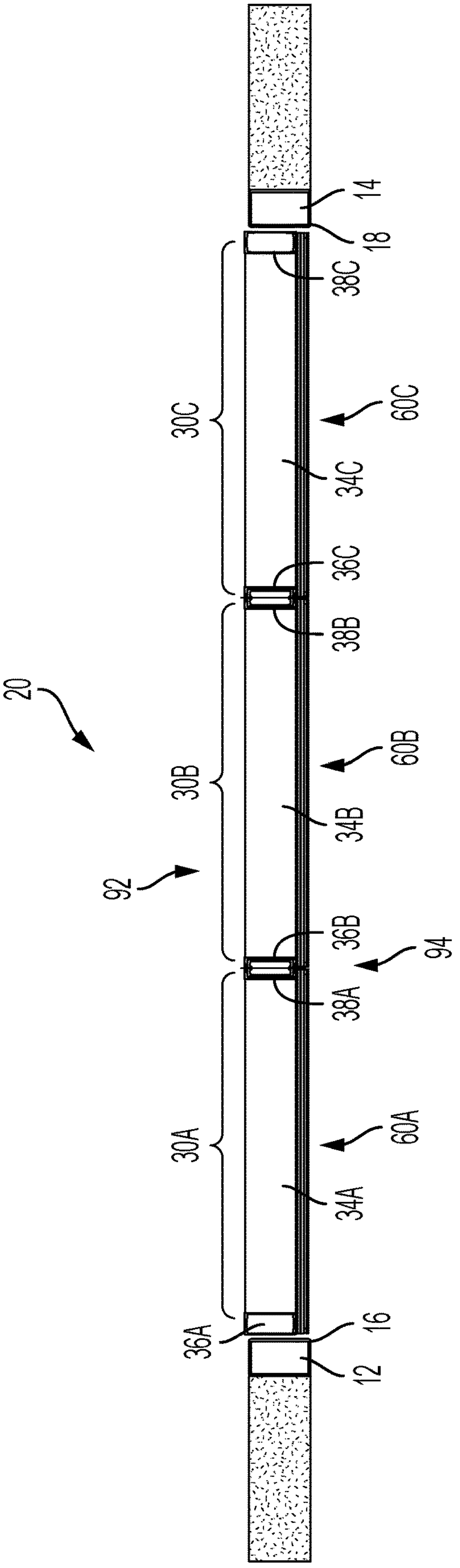
FIG. 1C is a top view of the flood barrier shown in FIG. 1 wherein the flood barrier is received in a window opening.

In the embodiment disclosed in FIG. 1B, the flood barrier 20 includes three frame units 30A, 30B, and 30C. As shown in FIG. 1C, each frame 30A, 30B, and 30C has an insulated glass unit 60A, 60B, and 60C fixed relative thereto. According one embodiment of the present invention, each individual frame unit and associated insulated glass unit is individually assembled in a factory. In this manner, it is possible to perform the precision task of fixing the insulated glass unit to the frame. The individual units are then shipped to the site of installation. At the site of installation, the frame 30A, 30B, and 30C are assembled together so that the second side member 38A of frame 30A is adjacent to the first side member 36B of frame 30B. Likewise, the second side member 38B of frame 30B is adjacent to the first side member 36C of frame C. In this manner, a window wall is assembled. In this configuration, the exterior surface of each insulated glass unit is coplanar. Likewise, the bottom members 34A, 34B, and 34C of each frame are aligned and the top members 32A, 32B, and 32C are aligned. In this manner, the frames may be assembled in the field to form a larger window wall. In reference to FIG. 1C, a flood barrier 20 is shown received in a window opening 10 having a first side 12 and a second side 14. As will be understood by a person having ordinary skill in the art and familiar with this invention, the external shape and dimensions of the flood barrier 20 are similar to the dimensions of the window opening 10. For example, the window opening 10 defines a rectangle having a width, height, and depth. The floor barrier window wall is configured to be received therein with some minor clearance. Afterward, the flood barrier is fixed in position into the window opening and the edges of the flood barrier and the adjoining parts of the insulated glass units are sealed.

Figure 6:
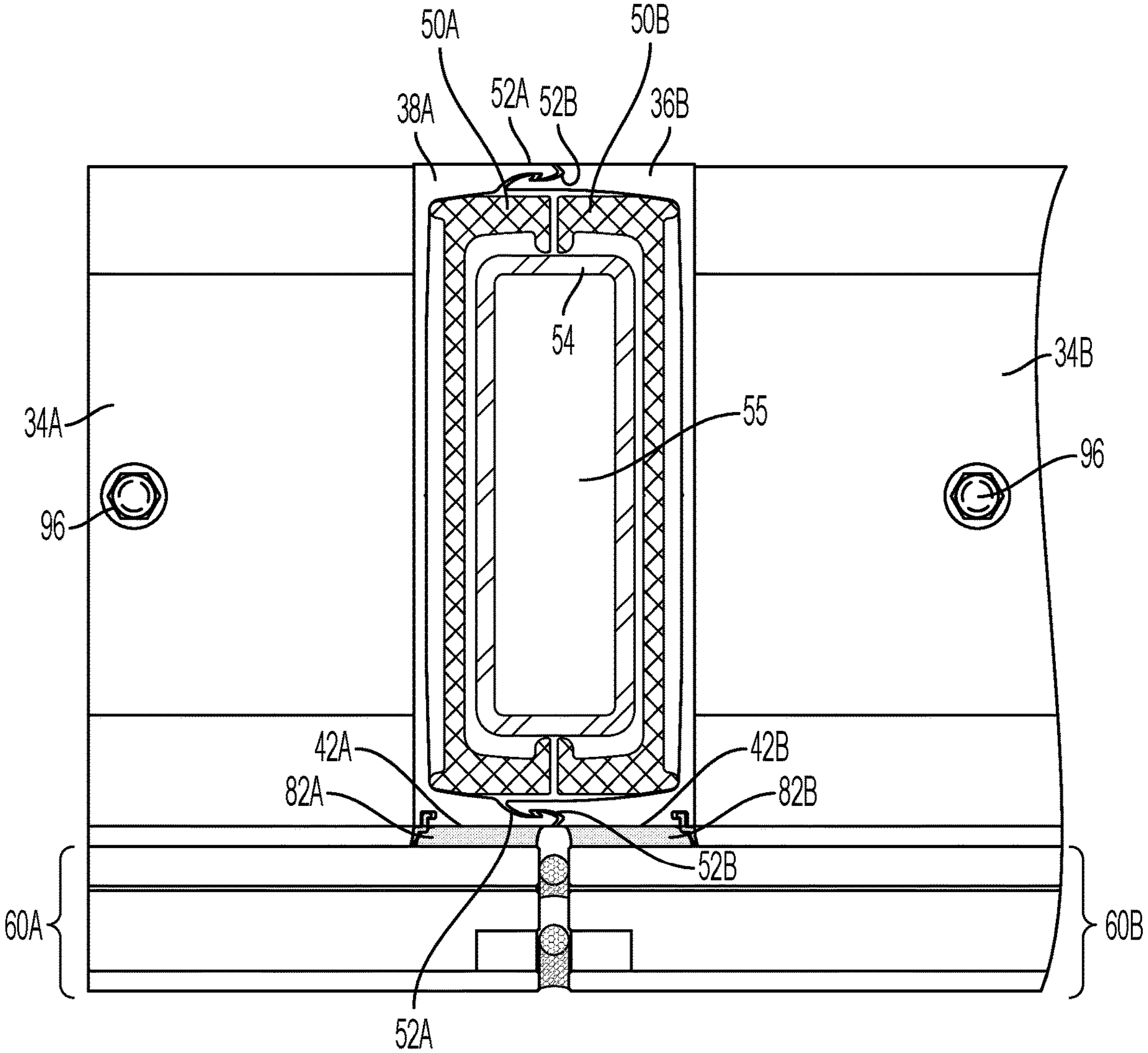
FIG. 6 is a cross sectional top view of the flood barrier shown in FIG. 1, wherein the flood barrier is received in a window opening.

In reference to FIG. 6, a cross section top view of a flood barrier widow wall 20 is shown. The second side member 38A of the first frame 30A is snapped together with the first side member 36B of the second frame 30B. In this manner, the frames 30A and 30B can be fixed together in the field. In the disclosed embodiment, the frames 30A, 30B, and 30C comprises mullions that are extruded from aluminum. The present invention is not in this regard and other methods of manufacture and materials may used to form the frame members in accordance with the present invention. Each opposing mullion 38A and 36B are provided with snap hooks 52A that extend the length of the mullion. The hooks 52A are configured to engage together and fix the frame members 38A and 36B. The units are configured such that the members may be fixed together after the glass is fixed to the exterior surface of the frame.

In further reference to the embodiment discloses in FIG. 6, the joined members 38A and 36B form a channel 55 that extends the length of the mullion. Additional support may be provided in the channel. For example, in the embodiment disclosed, a first support member comprising first and second halves 50A, 50B extends through the channel. In the embodiment disclosed, the first support member is aluminum. The channel further includes a second support member 54 that extends down the mullion. In the embodiment disclosed, the second support member 54 comprises steel. The internal support members 50A, 50B, and 54 enhance the rigidity of the flood barrier 10. The inventors have discovered that these members, particularly the steel reinforcing member 54 allow for the receive the 600 J impact on the FM Approval process while still inhibiting the ingress of fluid through the window opening. It should be understood that the reinforcing members are not required to practice the present invention and that they are not necessarily included in each frame member. For example, the reinforcing members may be limited to vertical support members.

Figure 5:
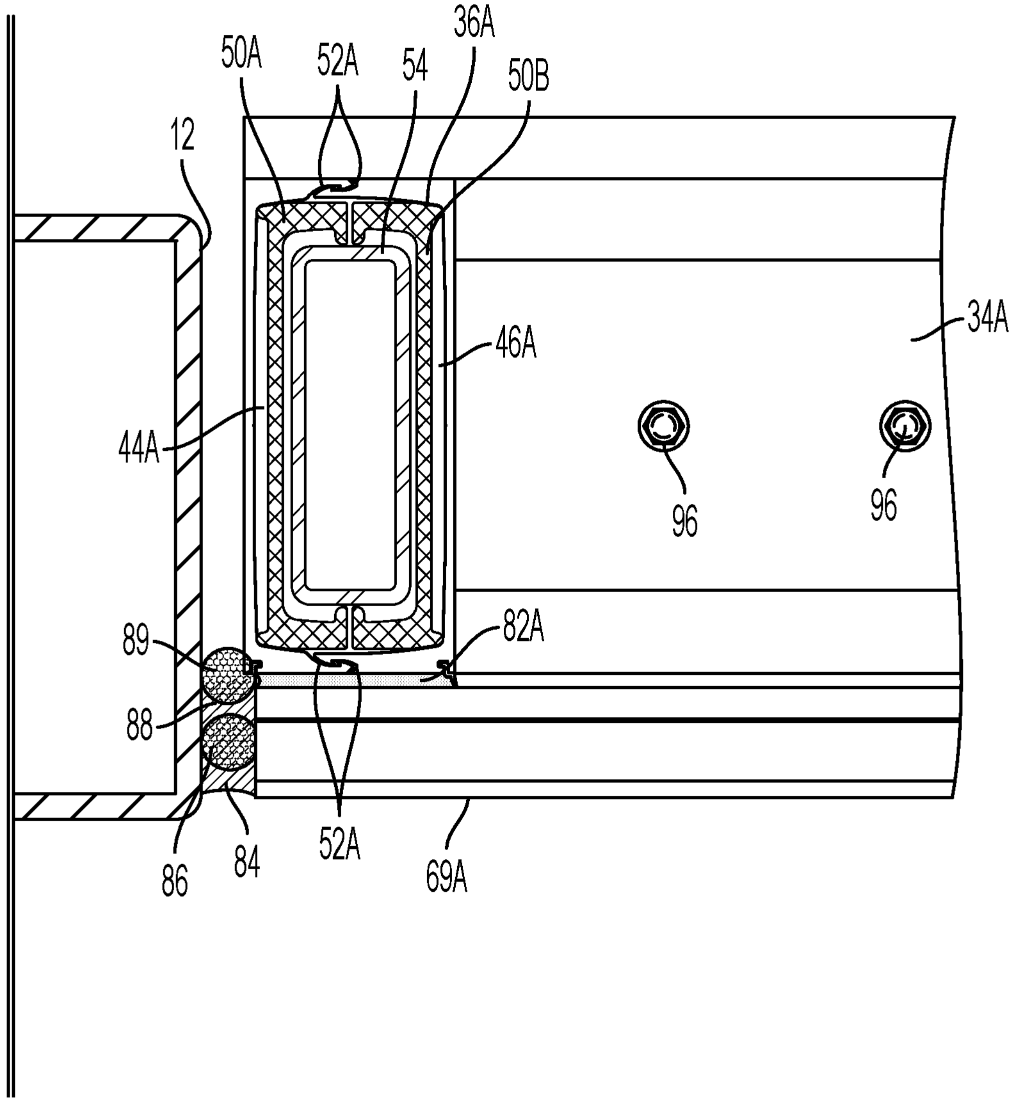
FIG. 5 is a cross sectional side view of the flood barrier shown in FIG. 1, wherein the flood barrier is received in a window opening.

It will be understood to a person of skill in the art and familiar with this disclosure that although a three panel or three frame embodiment is shown in the FIGS, the present invention is not limited in this regard. For example, the present invention may be practiced with a single frame, with two frames, or with more than three frames. In some embodiments of the present invention the side frames at opposing ends of the flood barrier 20 may include two mullions snapped together. For example, the first side member 36A shown in FIG. 5 includes two components that are snapped together. This is referred to as single side member, whereas the adjoining components 38A and 36B shown in FIG. 6 are referred to as separate frame members. In one embodiment of the invention, there is a distinction between these elements at it pertains to fixation of the insulated glass unit. For example, the components of 36A shown in FIG. 5 must be joined and fixed prior to fixation of the insulated glass unit to the exterior surface 42A of the mullion. On the other hand, the second side member 38A and the first side member 36B are joined in the field after the respective insulated glass units 60A, 60B have been fixed to the exterior surface of each frame 42A, 42B.

Figure 2:
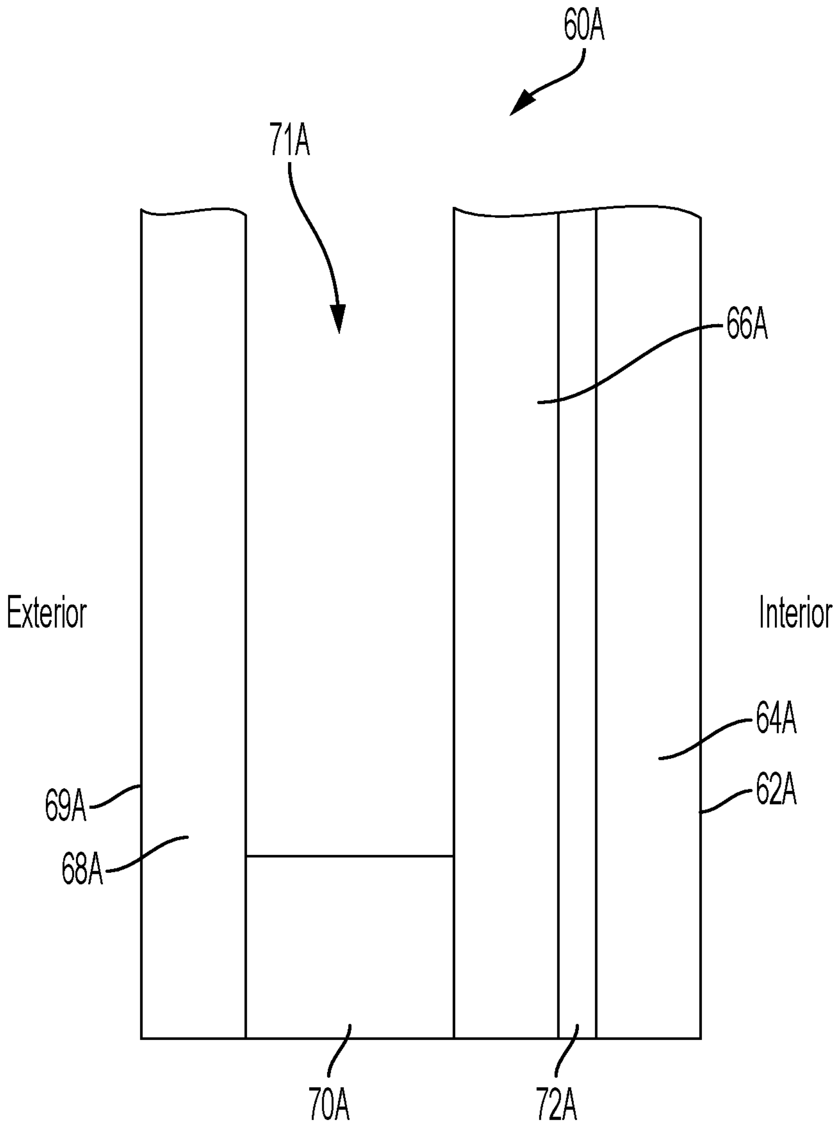
FIG. 2 is an illustration of a portion of an insulated glass unit for use with the flood barrier in accordance with one embodiment of the present invention.
Figure 3:
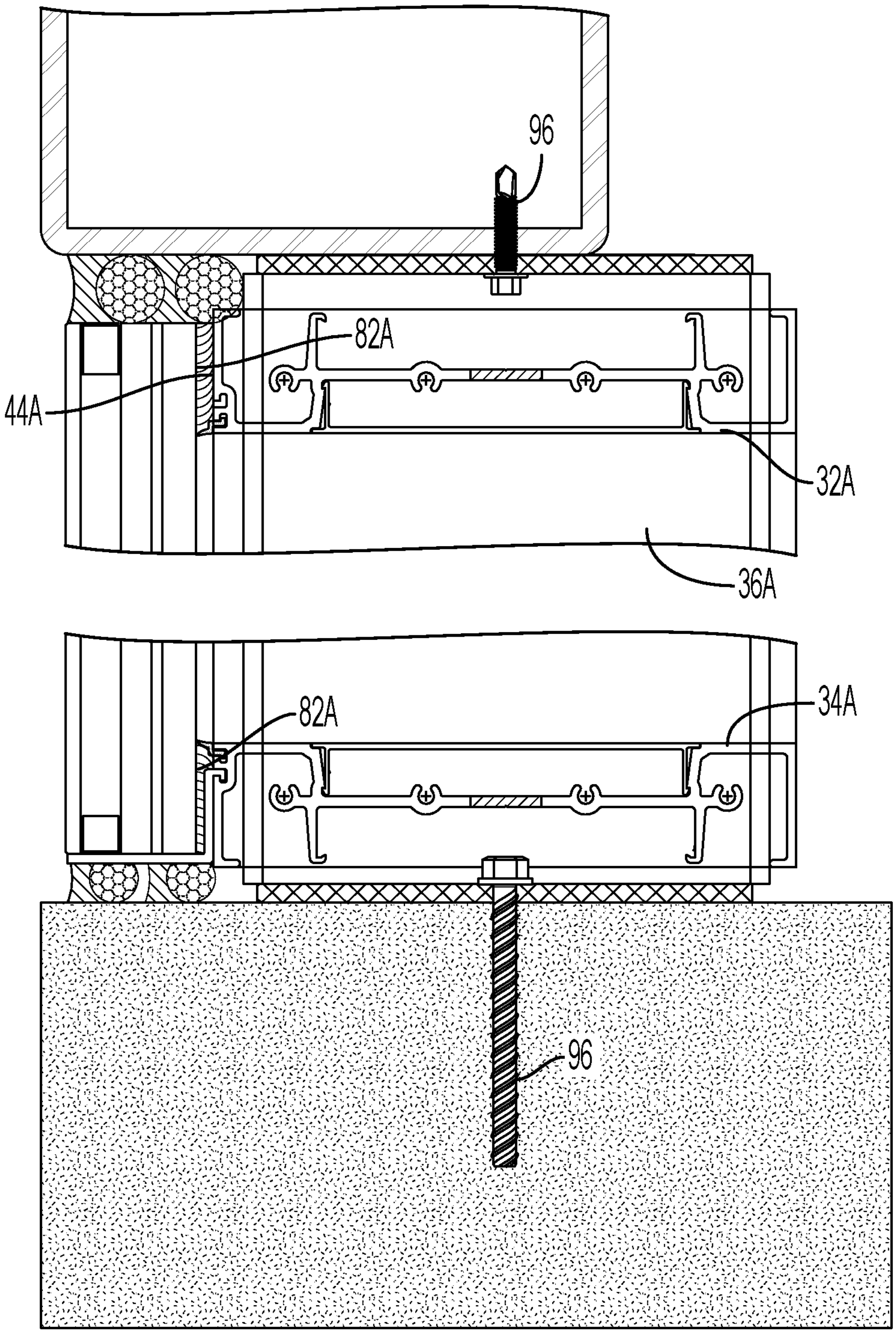
FIG. 3 is a cross sectional view of the flood barrier shown in FIG. 1, wherein the flood barrier is received in a window opening.

In reference to FIG. 1C and FIG. 2, an insulated glass unit 60A, 60B, and 60C is shown. An interior surface 62A of the insulated glass unit 60A is fixed to an exterior surface 42A of the frame 30A. The first insulated glass unit 60A comprises a first panel of glass 64A defining an interior surface 62A of the first insulated glass unit 60A. The first insulated glass unit 60A further comprises a second panel of glass 66A. The first insulated glass panel comprising a third panel of glass 68A defining an exterior surface 69A of the first insulated glass unit 60A. The second panel of glass 66A is disposed between the first panel of glass 64A and the third panel of glass 68A. The third panel of glass 68A is spaced apart from the second panel of glass 66A so as to define a cavity 71A between the second panel of glass and the third panel of glass. A spacer 70A is placed between the second panel of glass 66A and the third panel of glass 68A. The spacer 70A extends along at least a portion of a periphery of the second panel of glass 68A and the third panel of glass 69A. In the embodiments disclosed, the spacer extends along the entire periphery of the second panel of class 68A and the third panel of glass 69A. In this manner, the cavity 71A can be sealed and evacuated and/or filled with a gas to create a desiccant channel, thereby inhibiting condensation from forming in the insulated glass unit.

The inventor has discovered that by including the third panel of glass 68A in the insulated glass unit 60A, the system 20 can withstand force impact while still inhibiting the ingress of water through the window opening 10. In one embodiment of the present invention, the third panel of class comprises a clear tempered glass having a thickness of 0.25". The space between the third panel 68A and the second panel 66A is 0.50". The spacer has a thickness of 0.50". The second panel of glass 66A is clear tempered glass and has a thickness of 0.50" and the first panel of glass 62A is clear tempered glass and has a thickness of 0.50". In the embodiment disclosed, an interlayer 72A is provided between the first panel of glass 64A and the second panel of glass 66A. An example of an interlayer is the SentryGlas® interlayer. This interlayer is laminated between the first panel and the second panel to increase the strength, clarity, security, and or weather of the insulated glass unit. It should be understood that the present invention is not limited to an insulated glass unit and that other types of glass units may be used in accordance with the present invention. For example, the present invention may be practiced with a first glass unit comprising a first panel laminated to a second panel and excluding a third panel.

In another embodiment of the present invention, the third panel of class comprises a clear tempered glass having a thickness of 0.25". The space between the third panel 68A and the second panel 66A is 0.50". The spacer has a thickness of 0.50". The second panel of glass 66A is clear heat strengthened glass and has a thickness of 0.375" and the first panel of glass 62A is clear heat strengthened glass and has a thickness of 0.375". In the embodiment disclosed, an interlayer 72A is provided between the first panel of glass 64A and the second panel of glass 66A. It should be understood to a person of ordinary skill in the art and familiar with the disclosure that the dimensions of the insulated glass may vary so long as the system provides robustness required to withstand forces while maintaining water leakage at expectable levels.

The insulated glass unit is fixed to the frame to form a window unit that can be shipped to the job site and installed in the window opening. In reference to the first frame, the exterior surface of the first frame 42A is fixed to the interior surface 62A of the first insulated glass unit 60A. A structural sealant 82A is used to fix the exterior surface 42A of the frame 30A to the interior surface 62A of the insulated glass unit 60A. In one embodiment of the present invention, the structural seal 82A is a glazing ribbon. In yet a further embodiment, the glazing ribbon comprises a structural sealant. In one embodiment of the present invention, the glazing ribbon 82A contacts the exterior surface 42A of the top member 32A, the bottom member 34A, the first side member 36A, and the second side member 38A. In yet a further embodiment, the glazing ribbon extends continuously around the rectangle formed by the top member, the bottom member, the first side member, and the second side member.

In one embodiment of the present invention, the first frame 30A is assembled. The frame 30A is placed on a level table wherein the exterior surface 42A of the frame is facing upwards. A glazing ribbon 82A is applied to the exterior surface 42A of the frame using a system, such as a nozzle and sealant reservoir. The insulated glass unit 60A is then lowered onto the exterior surface 42A of the first frame 30A and clamped thereon. In this manner, the insulated glass unit is fixed to the exterior surface of the frame. The inventors have discovered that this method for providing the sealant along the exterior surface of the frame results in a flood barrier that inhibits the ingress of water through the window opening.

In the embodiment disclosed in the FIGS, silicone based structural sealant is used. In one embodiment of the present invention, the structural sealant is 983 Dow Corning®, a structural glazing. The present invention is not limited in this regard, and other sealants may be used. The sealant 82A provides both weather sealing and structural support to for the insulated glass unit 60A. In this manner, the flood barrier 20 in accordance with the present invention does not require additional structural support on the exterior surface 69A of on the insulated glass unit 60A to fix the unit relative to the frame 30. A decorative façade may be included, but is not required to provide structural support.

After the insulated glass units are fixed to the respective frames, the units are shipped to the job site for installation into the window opening 10. The flood barrier 20 is positioned in the window opening 10 and fixed relative thereto so that the interior surface 62A of the first insulated glass unit 60A is adjacent to an area inside the window opening 92 and the exterior surface 69A of the first insulated glass unit 60A is adjacent to an area outside the window opening 94. In some embodiments of the present invention, the window wall 20 is fixed to the window opening 10 using fasteners 96 that connect the top member 32A to the head 12 and connect the bottom 34A to the sill 14. In the embodiment disclosed, the system 10 does not includes fasteners fixing the first side member to the first jamb 16 or the second side member to the second jamb 18. The present invention is not limited in this regard, and a person of skill will understand that such fasteners may be used. The inventor has discovered that by excluding such lateral fasteners, the system provides for a degree of contraction and expansion. The system is remains sealed via the seals discussed in further detail below.

To the extent the flood barrier includes two or more window units, they can be assembled or fixed at the job site using the above described methods and structure.

After the flood barrier 20 is fixed relative to the window opening 10, a seal 84 is provided around the perimeter of the window wall 20 and between each insulated glass unit 60A, 60B, and 60C. The purpose of the seal is to inhibit the flow of water from an area outside the window to an area inside the window. The seal 84 is provided between outside surface of the insulated glass unit and the inside surface of the window opening. In reference to FIG. 4, the cross section of the seal 83 forms an hour-glass. In one embodiment of the present invention, the seal is Dowsil 795 Silicone Building Sealant. This sealant is used because it is highly resistant to weather, radiant heat, and temperature extremes. In addition, the sealant provides additional support. The sealant can be applied using a gun or other known methods. It will be understood that while a specific sealant is disclosed herein, the present invention is not limited in this regard. In the embodiment disclose in the FIGS, the seal 84 extends along the entire perimeter of the window wall 20 and between the insulated lass unit (as shown in FIG. 6). A foam backer is 86 is provided behind the seal 88. As shown in FIG. 6, the foam backer road is between the seal 83 and the bottom frame member 34A in the direction perpendicular to the window opening 10. The backer road may comprise, for example a breathable foam such as an open cell foam. The backer road 86 is beneficial for at least the reasons that it inhibits migration of the seal in the area between the insulated glass unit and the window opening.

In reference to the embodiment disclose in the FIGS, the flood barrier in accordance with the present invention includes a second seal 88 and a second back road 89 in the channel between the insulated glass unit and the window opening. The inventor has discovered that the second seal 88 and second foam back rod provide redundancy further inhibit leakage. While a second seal is shown in the FIGS, the present invention is not limited in this regard and a person of skill in the art and familiar with this disclosure will understand that the present invention may be practice with one seal. In yet other embodiments, the present invention may be practiced with three seals. It yet other embodiments of the present invention, a different form of seal may be used.

Figure 4:
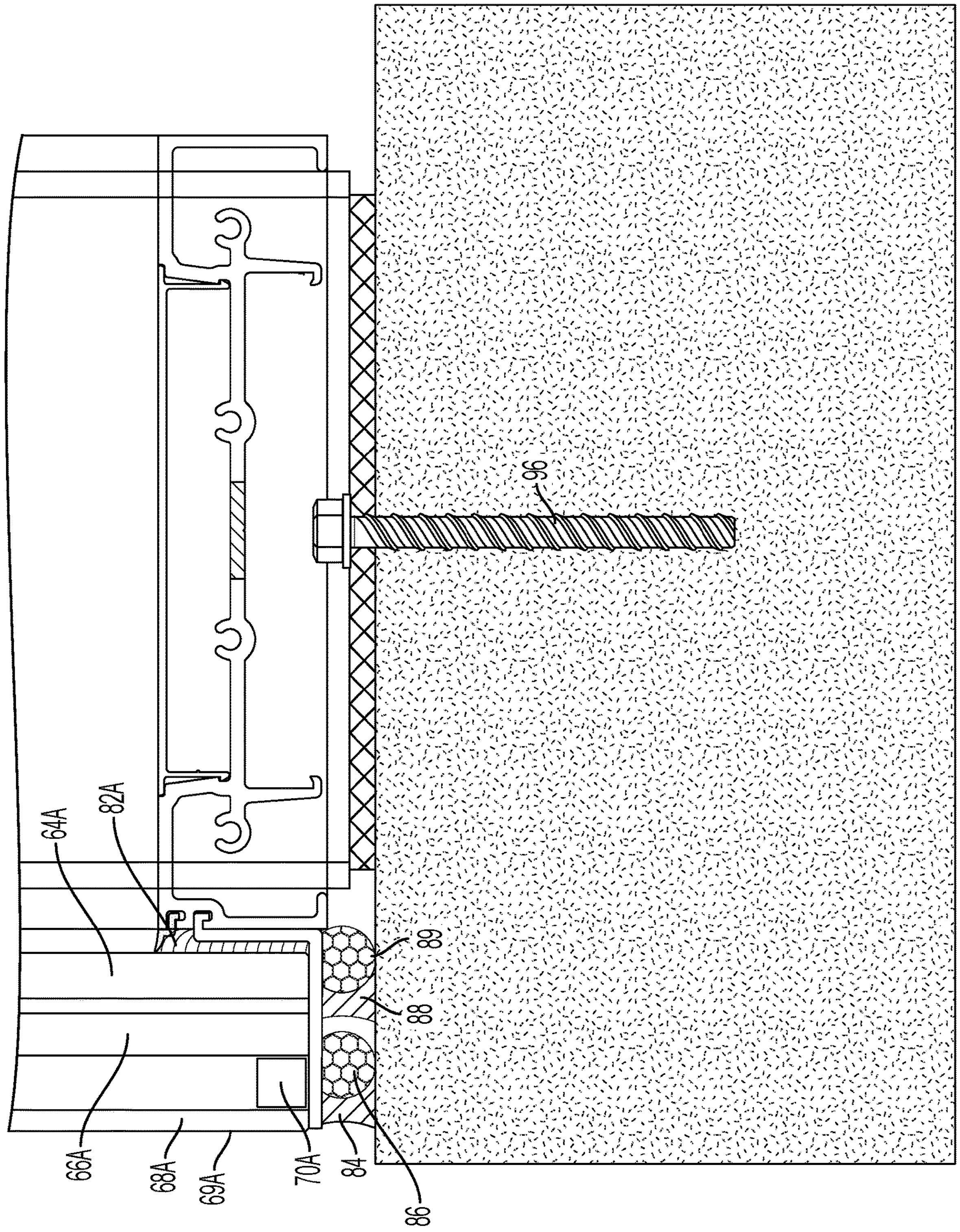
FIG. 4 is a cross sectional view of the flood barrier shown in FIG. 1, wherein the flood barrier is received in a window opening.

In reference to FIG. 4, the flood barrier 10*a* includes a seat element 110 fixed relative to the bottom member 34A. The seat element extending distally from the exterior surface 42A of the frame 30A in a direction perpendicular to the window opening 10. A bottom surface of the first insulated glass unit 60A is in contact with the seat element. The seat element inhibits translational movement of the insulated glass unit 60A relative to the first frame unit along a plane parallel to the window opening. The seat extends to the exterior of surface of the insulated glass unit. In the embodiment with the seat, the seals 84, 88, and back roads 86, 89 are between the bottom of the seat and the window opening. The inventor has discovered that while the structural sealant supports the insulated glass unit 60, the seat 110 inhibits minute movements of the insulated glass unit relative to the frame, thereby retaining sufficient seal to achieve the FM Approvals certification. It will be understood to a person of ordinary skill in the art and familiar with the disclosure that seat element is not required to practice the present invention.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What is claimed is:

1. A flood barrier system for inhibiting the ingress of water through a window opening in a structure, the system comprising:

a flood barrier:

a first frame configured to be received in the window opening, the first frame comprising a top member, a bottom member opposite the top member, a first side member perpendicular to the top member, and a second side member parallel to the first side member, the members being arranged to form a rectangle having a through opening, the first frame having an exterior surface that is parallel to the window opening when the flood barrier is received in the window opening, the first frame having an outside surface that is perpendicular to the window opening when the flood barrier is received in the window opening, the outside surface extending along a perimeter of the first frame, the first frame having an inside surface defining the through opening, the inside surface being perpendicular to the window opening when the flood barrier is received in the window opening;

a first glass unit comprising a first panel of glass defining an interior surface of the first glass unit, the first glass unit further comprising a second panel of glass laminated to the first panel of glass;

the exterior surface of the first frame is fixed to the interior surface of the first glass unit by a structural sealant between the exterior surface of the first frame and the interior surface of the first glass unit;

wherein the flood barrier is positioned in the window opening and fixed relative thereto so that the interior surface of the first glass unit is adjacent to an area inside the window opening and the exterior surface of the first glass unit is adjacent to an area outside the window opening;

wherein the flood barrier inhibits the ingress of water through the window opening from the area outside the window opening to the area inside the window opening wherein the first glass unit comprises a first insulated glass unit, the first insulated glass unit comprising a third panel of glass defining an exterior surface of the first insulated glass unit, the second panel of glass being disposed between the first panel of glass and the third panel of glass, the third panel of glass being spaced apart from the second panel of glass so as to define a cavity between the second panel of glass and the third panel of glass, a spacer between the second panel of glass and the third panel of glass, the spacer extending along at least a portion of a periphery of the second panel of glass and the third panel of glass;

wherein the structural sealant comprises a glazing ribbon of silicone between the exterior surface of the first frame and the interior surface of the first insulated glass unit;

wherein the glazing ribbon contacts an exterior surface of the top member, an exterior surface of the bottom member, an exterior surface of the first side member, and an exterior surface of the second side member;

wherein the glazing ribbon extends continuously around the rectangle formed by the top member, the bottom member, the first side member, and the second side member;

wherein the system excludes a structure external to the first insulated glass unit, the structure being configured to retain the first insulated glass unit in position relative to the first frame.

2. The flood barrier system for inhibiting the ingress of water through a window opening in a structure of claim 1, further comprising:

a seal between the flood barrier system and the window opening.

3. The flood barrier system for inhibiting the ingress of water through a window opening in a structure of claim 2, wherein the system is configured to have no material leakage through the window opening from the area outside the window opening to the area inside the window opening for a period of at least twenty-two hours when the static water pressure on the area outside of the window opening is greater than or equal to a height of four feet as measured from a bottom of the first insulated glass unit.

4. The flood barrier system for inhibiting the ingress of water through a window opening in a structure of claim 2, wherein the system is configured to have no material leakage through the window opening from the area outside the window opening to the area inside the window opening for a period of at least twenty-two hours when the static water pressure on the area outside of the window opening is greater than or equal to a height of four feet as measured from a bottom of the first insulated glass unit;

wherein said leakage is determined after the exterior surface of the flood barrier is subject to an impact of 600 Joules or greater in an area remote from a perimeter of the flood barrier.

5. The flood barrier system for inhibiting the ingress of water through a window opening in a structure of claim 2, wherein the flood barrier system is certified under ANSI/FM 2150.

6. The flood barrier system for inhibiting the ingress of water through a window opening in a structure of claim 3, further comprising:

a seat element fixed relative to the bottom member and extending distally from the exterior surface of the frame in a direction perpendicular to the window opening, a bottom surface of the first insulated glass unit being in contact with the seat element such that the seat element inhibits translational movement of the first insulated glass unit relative to the first frame unit along a plane parallel to the window opening.

7. The flood barrier system for inhibiting the ingress of water through a window opening in a structure of claim 3, wherein the flood barrier wall further comprises:

a second frame configured to be received in the window opening, the second frame comprising a top member, a bottom member opposite the top member, a first side member perpendicular to the top member, and a second side member parallel to the first side member, the members being arranged to form a rectangle having a through opening, the second frame having an exterior surface that is parallel to the window opening when the flood barrier is received in the window opening, the second frame having an outside surface that is perpendicular to the window opening when the flood barrier is received in the window opening, the outside surface extending along a perimeter of the second frame, the second frame having an inside surface defining the through opening, the inside surface being perpendicular to the window opening when the flood barrier is received in the window opening;

a second insulated glass unit comprising a first panel of glass defining an interior surface of the second insulated glass unit, the second insulated glass unit further comprising a second panel of glass, the second insulated glass panel comprising a third panel of glass defining an exterior surface of the second insulated glass unit, the second panel of glass being disposed between the first panel of glass and the third panel of glass, the third panel of glass being spaced apart from the second panel of glass so as to define a cavity between the second panel of glass and the third panel of glass, a spacer between the second panel of glass and the third panel of glass, the spacer extending along at least a portion of a periphery of the second panel of glass and the third panel of glass;

the exterior surface of the second frame is fixed to the interior surface of the second insulated glass unit by a structural sealant between the exterior surface of the second frame and the interior surface of the second insulated glass unit;

wherein the first frame is adjacent to the second frame when the flood barrier is received in the window opening so that the exterior surface of the first insulated glass unit is coplanar with the exterior surface of the second insulated glass unit;

wherein the second side member of the first frame is adjacent to the first side member of the second frame.

8. The flood barrier system for inhibiting the ingress of water through a window opening in a structure of claim 7, wherein the second side member of the first frame and the first side member of the second frame are configured to snap together after the first insulated glass unit is fixed to the first frame and after the second insulated glass unit is fixed to the second frame, thereby fixing the first frame relative to the second frame.

9. The flood barrier system for inhibiting the ingress of water through a window opening in a structure of claim 8, wherein the members of the first frame and the members of the second frame comprise mullions.

10. The flood barrier system for inhibiting the ingress of water through a window opening in a structure of claim 9, further comprising: a steel support extending through a vertical channel defined by one of the mullions.

11. The flood barrier system for inhibiting the ingress of water through a window opening in a structure of claim 8, further comprising:

a seal between the first insulated glass unit and the second insulated glass unit.

12. The flood barrier system for inhibiting the ingress of water through a window opening in a structure of claim 11, wherein the seal between the flood barrier system and the window opening and the seal between the first insulated glass unit and the second insulated glass unit comprises a first silicone seal and a first foam backer rod adjacent thereto and aligned in a direction perpendicular to the window opening.

13. The flood barrier system for inhibiting the ingress of water through a window opening in a structure of claim 12, wherein the seal between the flood barrier system and the window opening and the seal between the first insulated glass unit and the second insulated glass unit comprises a second silicone seal and a second foam backer rod adjacent thereto and aligned in a direction perpendicular to the window opening.

14. A method of inhibiting the ingress of water through a window opening in a structure, the method comprising:

providing a flood barrier having a first window unit and a second window unit:

the first window unit comprising:

a first frame configured to be received in the window opening, the first frame comprising a top member, a bottom member opposite the top member, a first side member perpendicular to the top member, and a second side member parallel to the first side member, the members being arranged to form a rectangle having a through opening, the first frame having an exterior surface that is parallel to the window opening when the flood barrier is received in the window opening, the first frame having an outside surface that is perpendicular to the window opening when the flood barrier is received in the window opening, the outside surface extending along a perimeter of the first frame, the first frame having an inside surface defining the through opening, the inside surface being perpendicular to the window opening when the flood barrier is received in the window opening;

a first insulated glass unit comprising a first panel of glass defining an interior surface of the first insulated glass unit, the first insulated glass unit further comprising a second panel of glass, the first insulated glass panel comprising a third panel of glass defining an exterior surface of the first insulated glass unit, the second panel of glass being disposed between the first panel of glass and the third panel of glass, the third panel of glass being spaced apart from the second panel of glass so as to define a cavity between the second panel of glass and the third panel of glass, a spacer between the second panel of glass and the third panel of glass, the spacer extending along at least a portion of a periphery of the second panel of glass and the third panel of glass;

the second window unit comprising:

a second frame configured to be received in the window opening, the second frame comprising a top member, a bottom member opposite the top member, a first side member perpendicular to the top member, and a second side member parallel to the first side member, the members being arranged to form a rectangle having a through opening, the second frame having an exterior surface that is parallel to the window opening when the flood barrier is received in the window opening, the second frame having an outside surface that is perpendicular to the window opening when the flood barrier is received in the window opening, the outside surface extending along a perimeter of the second frame, the second frame having an inside surface defining the through opening, the inside surface being perpendicular to the window opening when the flood barrier is received in the window opening;

a second insulated glass unit comprising a first panel of glass defining an interior surface of the second insulated glass unit, the second insulated glass unit further comprising a second panel of glass, the second insulated glass panel comprising a third panel of glass defining an exterior surface of the second insulated glass unit, the second panel of glass being disposed between the first panel of glass and the third panel of glass, the third panel of glass being spaced apart from the second panel of glass so as to define a cavity between the second panel of glass and the third panel of glass, a spacer between the second panel of glass and the third panel of glass, the spacer extending along at least a portion of a periphery of the second panel of glass and the third panel of glass;

fixing the first insulated glass unit to the frame by:

supporting the first frame on a horizontal surface so that the exterior surface of the first frame is facing upwards;

applying a continuous ribbon of structural sealant along the exterior surface of the first frame so that the continuous ribbon of structural sealant contacts the each of the members of the first frame;

compressing the first insulated glass unit on the frame so that the exterior surface of the first frame is fixed to the interior surface of the first insulated glass unit by the continuous ribbon of structural sealant between the exterior surface of the first frame and the interior surface of the first insulated glass unit;

fixing the second insulated glass unit to the frame by:

supporting the second frame on a horizontal surface so that the exterior surface of the second frame is facing upwards;

applying a continuous ribbon of structural sealant along the exterior surface of the second frame so that the continuous ribbon of structural sealant contacts the each of the members of the second frame;

compressing the second insulated glass unit on the second frame so that the exterior surface of the second frame is fixed to the interior surface of the second insulated glass unit by the continuous ribbon of structural sealant between the exterior surface of the first frame and the interior surface the second insulated glass unit;

at or proximate to a site of installation in the window opening, fixing the second side member of the first frame;

positioning the flood barrier in the window opening and fixing it relative thereto so that the interior surface of the first insulated glass unit is adjacent to an area inside the window opening and the exterior surface of the first insulated glass unit is adjacent to an area outside the window opening;

wherein the flood barrier inhibits the ingress of water through the window opening from the area outside the window opening to the area inside the window opening.

15. The method of inhibiting the ingress of water through a window opening in a structure according to claim 14, wherein the continuous ribbon of structural sealant extends continuously around the rectangle formed by the top member, the bottom member, the first side member, and the second side member.

16. The method of inhibiting the ingress of water through a window opening in a structure according to claim 15, further comprising the step of:

providing a seal between the flood barrier system and the window opening.

17. The method of inhibiting the ingress of water through a window opening in a structure according to claim 16, wherein the flood barrier is configured to have no material leakage through the window opening from the area outside the window opening to the area inside the window opening for a period of at least twenty-two hours when the static water pressure on the area outside of the window opening is greater than or equal to the height of the flood barrier system as measured from a bottom of the first insulated glass unit to the top of the first insulated glass unit.

18. The method of inhibiting the ingress of water through a window opening in a structure according to claim 17, further comprising the step of:

wherein the flood barrier system is certified under ANSI/FM 2150.

* * * * *